COMPUTATION UNIT FOR ANALOG COMPUTERS

Filed Aug. 6, 1962 3 Sheets-Sheet 1

Per Asbjorn Holst
INVENTOR.

BY Clarence A. O'Brien
and Harvey B. Jacobson
Attorneys

Per Asbjorn Holst
INVENTOR.

BY Clarence A. O'Brien
and Harvey B. Jacobson
Attorneys

COMPUTATION UNIT FOR ANALOG COMPUTERS

Filed Aug. 6, 1962

Per Asbjorn Holst
INVENTOR.

BY Clarence A. O'Brien and Harvey B. Jacobson
Attorneys

United States Patent Office 3,243,582
Patented Mar. 29, 1966

3,243,582
COMPUTATION UNIT FOR ANALOG COMPUTERS
Per Asbjorn Holst, West Roxbury, Mass.
(10 Ledgetree Road, Medfield, Mass. 02052)
Filed Aug. 6, 1962, Ser. No. 214,995
20 Claims. (Cl. 235—150.4)

This invention relates to a system, apparatus, and computational unit for use in analog computers.

One of the important basic concepts of the present invention is the use of a digital instruction system for complete control of all operations of an analog computer. By use of such a control system it is possible to design the analog computing devices so as to provide the same degree of flexibility in operation and control as a digital computer system having instructions fed into the computer from cards or tapes or from the keyboard of a control console. In this manner, the analog computer components of the present invention can be serviced as an independent unit and controlled by operators not familiar therewith. The programming is thus done by digital computers and the answers printed or recorded automatically.

The computer system of the present invention therefore combines the flexibility and compatibility of a modular packaged system of computational units with a maximum of accuracy and speed in operation and control through use of the digital instruction system based on the same principles as utilized in most digital computers, yet features the advantages of a continuous analog memory as an integrated part of the computer.

In accordance with the foregoing, it is therefore a primary object of the present invention to provide a general purpose wide bandwidth analog computer which is completely automated in the setting up of computational circuits, problem coefficient and operational characteristics section, control of computer operation, solution display and read-out of information. The computer system of the present invention and its advantageous attributes, are based upon a novel computational unit but may further feature in addition thereto, completely automatic diode-function generating units, quarter-square electronic multiplier-divider units, non-linear and statistical units, switches and logic control units. As hereinbefore indicated, the control of the computer system is based upon a digital instruction arrangement which is similar to systems developed for digital computers executed through the use of a control unit having instruction read-in, operational control and read-out in connection with peripheral equipment such as punched tape or card units, magnetic tape, drum or disc storage or direct communication with a digital computer, data processor or a process control system. Also, a memory device such as a magnetic drum unit is directly attached to the operational system of the present invention to provide continuous memory functions, transport delay simulation and instruction information storage and control.

In accordance with the foregoing objects, the computer system of the present invention comprises three basic operational sub-systems including computational units, a central control arrangement and a memory device for simultaneous storage of both continous analog signals and digital information in a discrete decimal form. In this manner, the system of the present invention combines a maximum of efficient performance of all computer units with the ultimate of flexibility in terms of operations and automatic control, and utilizes to its full extent, the advantages of a continuous memory in analog computations. In realizing these objectives, the computer system of the present invention introduces into the field of analog computers, the optimum performance characteristics required in connection with time sharing of operational units, for statistical and iterative computations, hybrid systems and on-line process control and data processing, and offers great advantages in the use of digital programming for operational convenience and speed of operation. Further, the inclusion of a memory device as an integrated part of the computer system, endows it with a great advantage in terms of continuous memory storage of analog computer solutions, and directly applies to the use of the present system for time sharing analog computations, iterative techniques and transport delay simulations together with sampled data communications with digital computers, data processing equipment, etc. The memory storage device can also be used for storage of digital information such as programmed instructions and numerical values for coefficients and scale factors, and may be applied for computer program control in exploratory system simulations, parameter search procedures and automatic program modifications. Also, direct communication between the memory device and peripheral storage devices such as tape units, punched card machines, etc., make it possible to run through very extensive and complex analog computations in short time sequences, and without appreciable reduction in the signal to noise ratio involved in transferring information to and from the computer system.

Thees together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
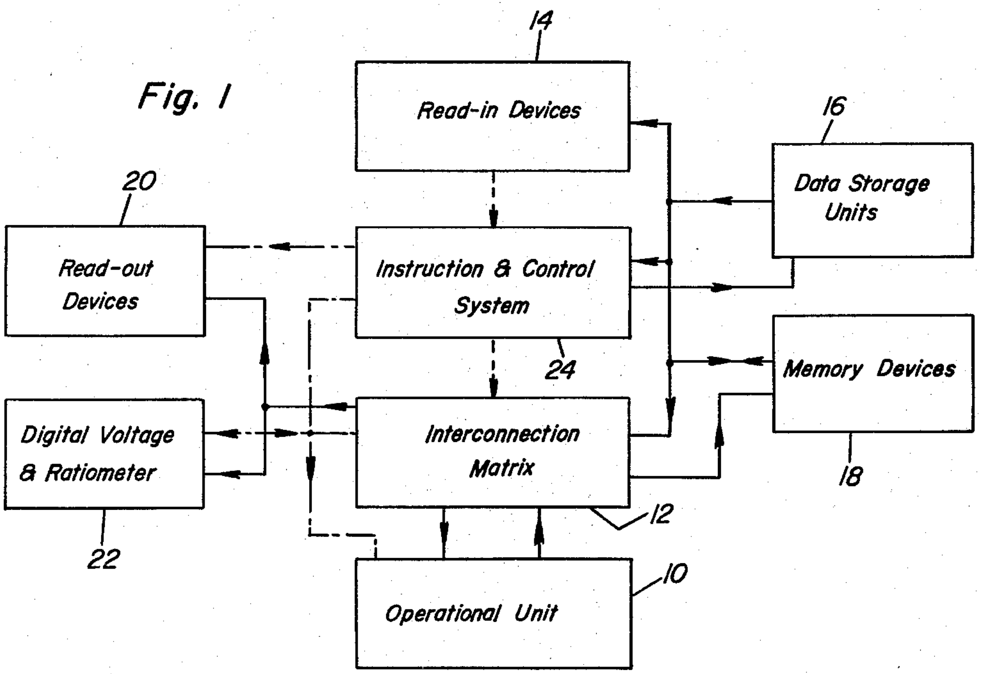
FIGURE 1 is a schematic flow diagram generally illustrating the relationship between the various components of the computer system of the present invention with an operational unit thereof.

Referring now to the drawings, attention is initially invited toward FIGURE 1 diagrammatically illustrating the general arrangement of the computing system of the present invention in relation to an operational unit 10 thereof. It will be appreciated of course, that a plurality of operational units will be associated with the computer in accordance with the installational design, requirements etc. As shown by solid flow lines, information is transferred to and from the operational unit 10 by means of an interconnection matrix 12. Information is therefore supplied to the interconnection matrix 12 from the read-in devices 14, the data storage units 16 and the memory devices 18. The information so transferred to the operational unit 10, will be in the form of analog information and digital instructions producing digital and analogous outputs which may be transferred to the memory devices 18 from which both analog and digital instructions are derived. The outputs from the operational unit are also transferred by the interconnection matrix 12 to the read-out devices 20 for display purposes. Also, the outputs from the operational units are supplied to a digital volt and ratiometer 22 for gain adjustment and signal voltage measurement purposes as will hereafter be described in greater detail. It will also be observed, that instructions, commands and triggering pulses are shown by dotted flow lines in FIGURE 1 by means of which digital instructions from the read-in devices 14 are transferred by means of the instruction and control system 24 to the interconnection matrix so as to control the flow of information to and from the operational unit 10. Digital instructions are also directly supplied to the operational units and to and from the digital ratiometer for gain adjustment purposes. Also, read-out instructions are supplied from the instruction control system 24 to the read-out devices 20. The advantages derived from the system as generally illustrated in FIGURE 1, result primarily from the novel operational unit arrangement making possible the application of digital instructions to analog computer operation.

Figure 3:
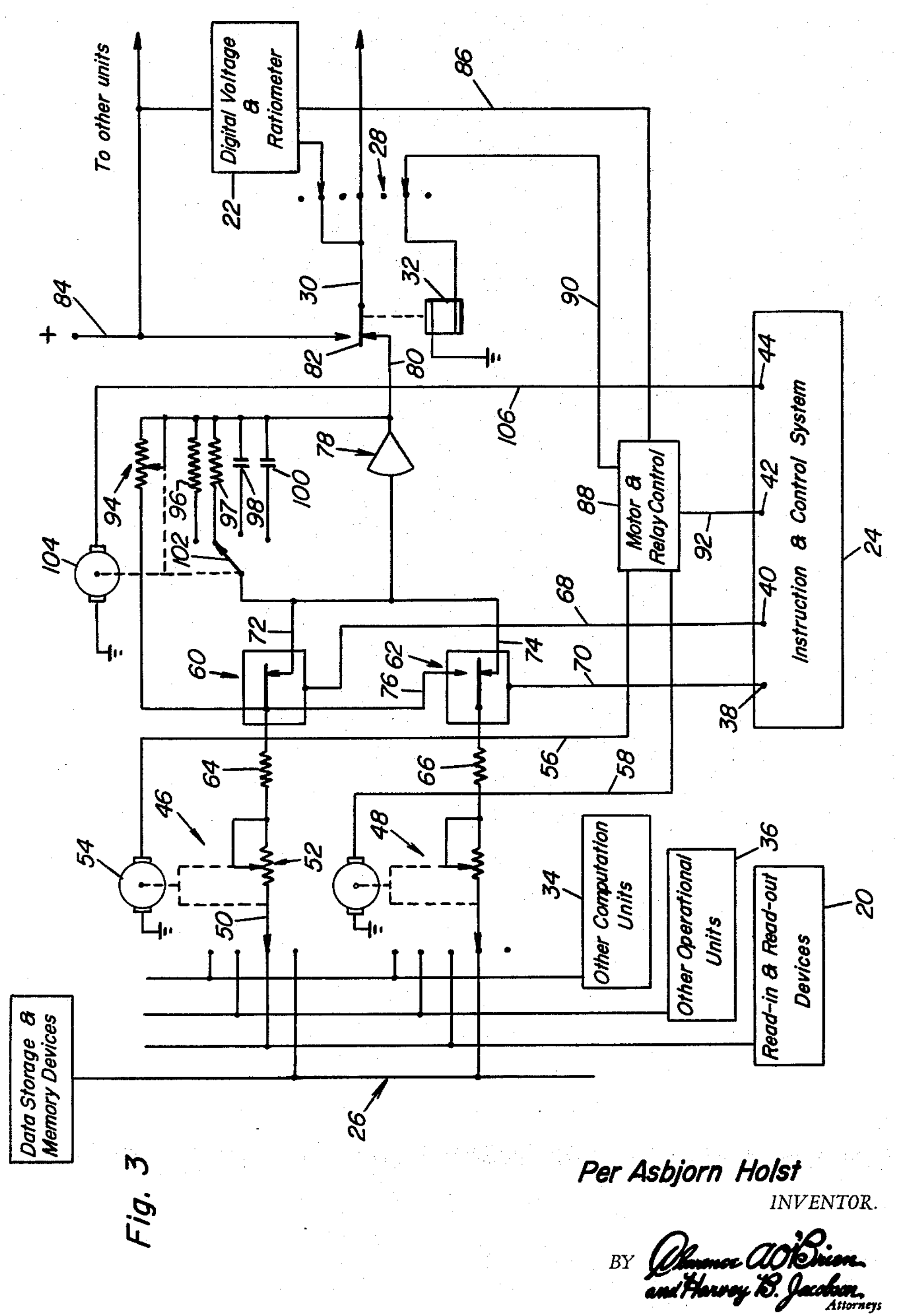
FIGURE 3 is a circuit diagram of one form of computational unit forming part of the computer system of the present invention and its relationships to the other components of the system.

Referring now to FIGURE 3, the arrangement of a computational type of operating unit is illustrated, this unit being adapted to perform a plurality of different types of mathematical operations in connection with other operational units, and in accordance with digital instructions supplied thereto and the characteristics of the input signals. The computations performed by the computational unit may occur at any speeds from slower than real time to high speed, and can be operated in a number of different modes, such as D.C. real time analog computer, a D.C. real time computer with repetitive operation, or as a high speed truly repetitive analog computer. Thus, because of the command possibilities associated with the computational units and the continuous memory facilities aforementioned, the essential requirements are present for a completely automatic, repetitive, iterative and statistical analog computer capable of time-sharing operation and useful for process control applications and in any hybrid system arrangements. In particular, the computational circuit arrangement shown in FIGURE 3 may perform arithmetical, differential or other continuous or discrete functional operations in connection with input signal voltages supplied thereto by a plurality of uncommitted trunklines 26 capable of transferring said signals in the form of analog or digital information and at different rates of speed. The trunklines 26 form part of an interconnection unit associated with the computational unit which in turn forms part of the aforementioned interconnection matrix 12. The lines 26 are uncommitted in that a selection is made therefrom by the computational circuit in accordance with digital instruction. Accordingly, the interconnection unit also includes committed signal paths 28 associated with the operational unit output line 30, an output control relay 32 and the digital ratiometer 22. Thus, with respect to the committed paths, no selection is made for routing the output. The uncommitted trunklines 26 may also be associated with other computational units 34, other operational units 36, with the read-out devices 20 and with the data-storage and memory devices. The instruction and control system 24 is furthermore operatively related to the computational unit being described in FIGURE 3, by means of command signal terminals 38, 40, 42 and 44.

The signal input voltage portion of the computational circuit includes a plurality of scale factor varying mechanisms generally referred to by reference numerals 46 and 48 also serving to select input voltages from the uncommitted trunklines 26 and to vary these voltages in accordance with coefficient value information. Each of the input voltage varying mechanisms 46 and 48 therefore includes a signal selector switch arm 50 connected to an adjustable potentiometer 52, both the selector switch arm 50 and the potentiometer setting being controlled by a grounded servo motor 54. Command pulses are accordingly supplied to the servo motors 54 of the mechanisms 46 and 48 by means of the command lines 56 and 58. Command signals for the lines 56 and 58 are derived from the instruction and control system 24 by means of the command terminal 42. Interconnecting each of the input signal control mechanisms 46 and 48, are electronic switch devices 60 and 62. The electronic switch devices 60 and 62 are connected to the associated mechanisms 46 and 48 by fixed resistors 64 and 66 respectively, these electronic switch devices being of any suitable type or form such as bi-stable multi-vibrators arranged to switch an input signal from one output to another upon receipt of a gating or triggering pulse. It should be understood that electronic switches are used for high speed operation, but other devices could be used in place thereof for accomplishing the purposes outlined. Accordingly, each of the electronic switches 60 and 62 is connected to the instruction and control system 24 by means of the command terminals 40 and 38. With no command signal voltage being applied to the command terminals 40 and 38 and the command lines 68 and 70 connected thereto, the electronic switch devices 60 and 62 will connect the associated input signal control mechanisms 46 and 48 through the fixed resistors 64 and 66, to the switch output terminals 72 and 74 as illustrated in FIGURE 3. Upon supply of the command signals to the line 68, the electronic switch device 60 will open the output terminal 72 so as to disconnect it from any input signal voltage. Upon receipt of a command signal through the command line 70, the electronic device 62 would transfer the input signal voltage to the switch output terminal line 76 which is connected to the input terminal of the electronic switch device 60. Thus, digital instructions supplied to the instruction and control system will be operative through the absence or presence of command signals at the command terminals 40 and 38, to control the conditions of the electronic switch devices 60 and 62 in order to control the mathematical operations performed by the computational unit.

The output terminals 72 and 74 of the electronic switch devices 60 and 62, are both connected to an operational amplifier device 78. The amplifier device 78 is chopper stabilized and chosen to have high gain, megacycle or wide frequency bandwidth and an extended signal voltage range. The output line 80 of the amplifier 78 is connected to the operational unit output line 30 by means of a normally closed relay switch 82 which is under the control of the relay 32 so that when the relay is energized, the operational unit output line 30 will be disconnected from the output line 80 of the amplifier and connected to a common reference voltage line 84 which is also connected to the other operational units.

The operational unit output line 30 is selectively connected by a committed signal path 28 of the interconnection unit associated with the computational unit to the digital ratiometer 22 this connection being established when digital instruction is supplied to the ratiometer by the digital control system of the present invention. The digital ratiometer is also connected to the reference voltage line 84 so that upon receipt of the proper instruction, the output voltage from the amplifier may be compared with the reference voltage and a corrective signal applied through the line 86 to a motor and relay control device 88 by means of which the command lines 56 and 58 to the input control mechanisms 46 and 48 are operatively connected to the instruction and control system and further by means of which the control relay 32 is energized. Therefore, upon the issuance of a corrective signal through the line 86, the motor and relay control 88 may supply energizing current through the line 90 to the control relay 32 thus disconnecting the output of the computational unit and at the same time supplying command signals through the lines 56 and 58 for corrective displacement of the input control mechanisms 46 and 48 in addition to resetting thereof in accordance with read-in instructions. The motor and relay control 88 is therefore connected to the command signal terminal 42 of the instruction and control system by the line 92.

The nature of the mathematical operations performed by the computational unit is determined by the feedback arrangement which includes a common feedback resistor 94 electrically connected between the input terminal of the electronic switch device 60 and the output 80 of the amplifier 78, said resistor being automatically adjustable for scaling purposes as will hereafter be explained. Also selectively connected in parallel to the output of the amplifier 78, are a plurality of feedback elements including resistive feedback elements 96 and 97 and a pair of capacitive feedback elements 98 and 100. A feedback selector switch 102 is therefore arranged to place in circuit one of the feedback elements 96, 97, 98, and 100 by connection thereof to the output terminal 72 of the electronic switch device 60. The position of the feedback selector switch 102 for prescribing the type of mathematical operation to be performed, as well as the setting of the feedback resistor 94, is controlled by the grounded servo motor 104 adapted to receive command pulses from the command terminal 44 of the instruction and control system through the command line 106.

Figure 2:
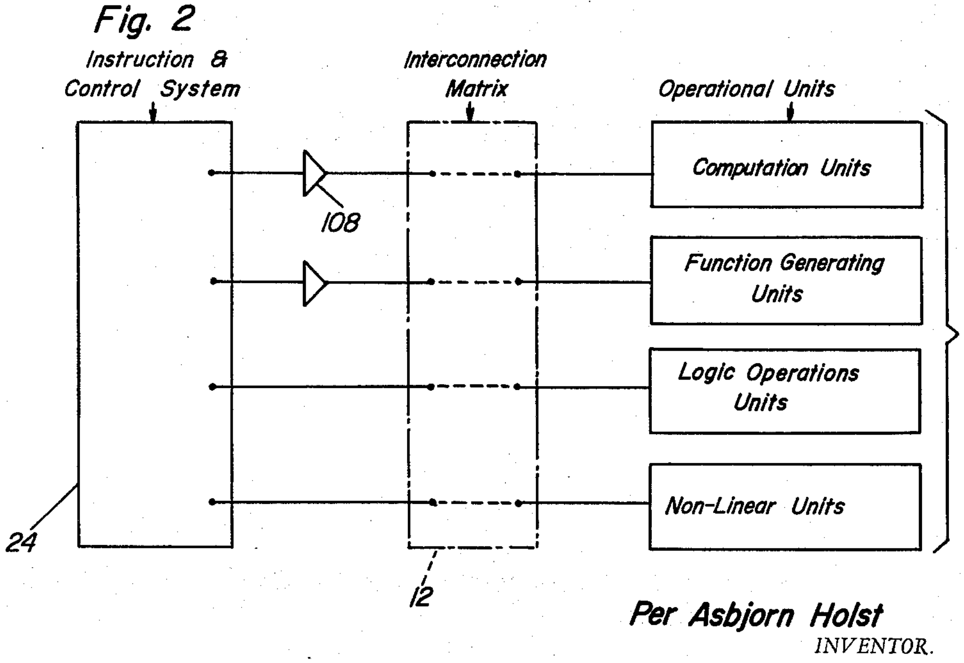
FIGURE 2 is a schematic flow diagram illustrating the general relationship between different operational units and other components of the computer system.

From the foregoing description of the computational unit, it will become apparent that the computational unit is particularly suited for performing analog operations in response to digital instruction and furthermore involves the application of completely committed coefficient potentiometers 52 in connection with the input control mechanisms 46 and 48 by using them as input resistor elements in the signal input network. Inasmuch as the potentiometer devices 52 are operative to reduce the input signal voltages, the computation units as well as the function generating units, are selectively connected through the interconnection matrix 12 to input amplifiers 108 as shown in FIGURE 2 without relying on patchwork connections that have characterized analog computer arrangements heretofore utilized. Thus, coefficients with values higher than unity may be obtained by use of amplifiers 108 so as to obtain coefficient value which is equal to the product of the amplifier gain of the amplifiers 108 and the coefficient value set at the potentiometers 52. Accordingly, committed potentiometers 52 are made possible by connection with each amplifier of the computational units in series relation. Thus, the potentiometer devices 52 may be set for coefficient values between two limits one greater than unity and one less than unity since the gain factor of the amplifiers 108 can be equalled to the ratio of the feedback impedance and input impedance of the described circuit arrangement in FIGURE 3. It is for this reason, that patchwork arrangements of analog computers heretofore utilized to interconnect coefficient potentiometers with operational amplifiers, are eliminated. Furthermore, since the potentiometer devices 52 of the present arrangement are not grounded, a reduction in load at the output of the amplifiers is achieved so as to reduce power requirements and eliminate loading nonlinearities. Also, the direct commitment of the potentiometers to the amplifier inputs reduces the number of possible interconnections in the interconnection matrix system and thus permits the use of a selector switch system.

Figure 4:
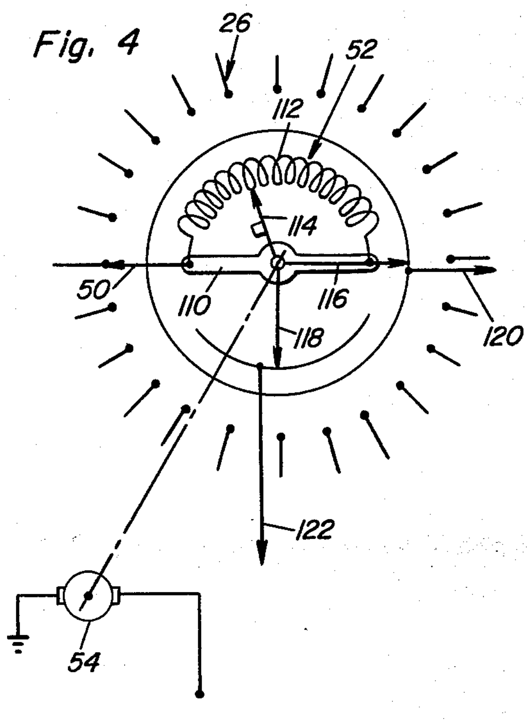
FIGURE 4 is a diagrammatic illustration of the input signal voltage varying mechanism associated with the computational units of the present invention.

A further advantageous attribute of the described computer unit circuit, relates to the manner in which the servo motors 54 both select the input voltage from the trunklines 26 and set the coefficient value on the potentiometers 52. Referring therefore to FIGURE 4 in particular, it will be observed that the input trunklines may be printed on a circuit board so that the interconnection terminals thereof may be engaged by the selector wiper arm 50 which is mounted on an actuator member 110 and is electrically connected to the resistance element 113 of the potentiometer device 52. The wiper arm 114 of the potentiometer is driven by the servo motor 54 through suitable gearing to a particular position with respect to the resistance element 112 in accordance with the coefficient value to be set. The potentiometer wiper arm 114 is therefore rotatable with and electrically connected to a pair of conductive brush members 116 and 118 establishing electrical connections to two alternative output lines 120 and 122 through which coefficient varied input voltages are supplied to the other components of the computation unit circuit. It will therefore be apparent, that the selector arm 50 and the coefficient setting of the wiper arm 114 may be operated in a sequential manner in order to select the interconnection terminal of the trunkline and the coefficient setting of the potentiometer. The potentiometer arm 114 may therefore be angularly displaced by the proper energizing signal to the servo motor 54 in a counter-clockwise direction so as to abut against the actuating member 110 and displace the selector wiper arm 50 to a new position. Thereafter, reverse rotation of the servo motor 54 will move the wiper arm 114 to its coefficient setting. It will be appreciated, of course, that other types of mechanical arrangements may be utilized in order to achieve the same type of sequential operation. Furthermore, the fact that the potentiometer device 52 and the servo motor 54 associated therewith is committed to a particular amplifier in the computation circuit, the measured output of the amplifier 78 supplied to the digital ratiometer system hereinbefore described, will provide means for automatically correcting through the setting of the potentiometer 52, for the loading effects of the amplifier outputs, non-linearities in the potentiometer, inaccuracies in the input and feedback elements, attenuations due to the interconnection system, etc. Calibrations for the gain ratios of the amplifiers will therefore not be required nor the use of precision components in connection with the input and feedback networks. It will be further appreciated that control over the selector 102 and adjustable feedback resistor 94 may be exercised by the servo motor 104 in a manner similar to that outlined with respect to potentiometer 52.

Referring now to FIGURE 3 once again, operation of the computation unit in connection with mathematical operations to be performed, may be described. With both of the electronic switch devices 60 and 62 in the normally closed conditions illustrated, corresponding to the absence of any command signals in the lines 68 and 70, the high gain amplifier 78 will be in a closed feedback loop determined by the common feedback element 94 to generate an output signal which is equal to the input signal voltage times a negative scale factor as determined by the setting of the potentiometer 52 ($aV_1$), where $a$ equals the negative scale factor of control mechanism 46 and $V_1$ equals the input voltage applied thereto. The computational unit will accordingly function to amplify and invert the input signal. If a command signal is thereafter applied to the electronic switch device 62 through the command line 70, the output of the high gain amplifier 78 will be equal to the sum of the input voltages supplied to the switch devices 60 and 62 times the scale factors respectively associated with the mechanisms 46 and 48 ($aV_1+bV_2$), where $b$ equals the scale factor of mechanism 48 and $V_2$ equals the input voltage supplied to the mechanism 48. Thus, the computational circuit may function to amplify the summation of two or more input signals. It should be appreciated however that the foregoing operation is achieved with only the common feedback element 94 in circuit. When the feedback selector switch 102 is connected to the resistive feedback element 97 however as illustrated in FIGURE 3, and both switch devices 60 and 62 are in the condition illustrated in FIGURE 3, upon supply of a command signal to the electronic switch device 60 through the command line 68, the common feedback resistance 94 would be removed from the circuit because switch 60 is then opened and the amplifier 78 is only in circuit with the output 74 of the switch device 62 and with the feedback resistive element 97. The output of the high gain amplifier 78 in this condition, will equal the product of input voltage and negative scale factor associated with the input control mechanism 48 ($bV_2$). Accordingly, under the latter described operation, amplification and switching between two input signals may be achieved as a third function of the computational unit. When the feedback selector 102 places in circuit one of the capacitive feedback elements 98 or 100, a command signal applied only to the switch device 60 would produce an output from the high gain amplifier 78 which would be equal to the time integral of the input voltage sampled at the electronic switch device 62 at the instant the voltage at output 72 of the electronic switch device 60 is removed by the command signal $$\left(\int_0^t bV_2dt+(aV_1)_{t=0}\right)$$

In this manner, integration of one input signal beginning with an initial condition determined by a second input signal may be achieved with electronic re-set control. If no input voltage appears at the electronic switch device 62 at the instant the command signal is suppled to the switch device 60 as described in the latter operation, the output signal from amplifier 78 would be equal to the input voltage ($aV_1$) at the switch device 60 at the time the command signal is applied thereto, this signal being held as a tracking function of the computational unit. On the other hand, if an input voltage did appear at the switch device 62 but not at the switch device 60, the output signal from the amplifier 78 would be equal to the time integral of the input signal at the switch device 62 so as to perform an integration function of an input signal with no initial condition. Under the latter conditions, should a command signal then be applied to the switch device 62, an integrated otuput signal ($bV_{2f}$) would appear at the output of the amplifier, the computational unit then functioning to integrate and hold an integrated value on command. It will therefore be appreciated from the foregoing operational attributes of the computational unit, that various mathematical operations may be performed by supply of digital instructions to the input control mechanisms 46 and 48. By selection of the feedback elements 96, 97, 98 and 100, through the servo motor driven selector switch 102, various amplifier characteristics and gains can be obtained. The capacitive feedback elements 98 and 100 will therefore be able to hold or store a voltage signal on command or operate as an integrator. If the capacitances of the feedback elements are changed, the integrator sensitivity or rate will be changed inversely or the ability to store voltage signals may be changed correspondingly. With the resistive feedback elements 96 and 97, the amplifier will operate as an inverting amplifier and with a gain of each input depending upon the ratio between the common feedback resistances 94, 96, and 97 and the respective input resistance values of the coefficient potentiometers 52 and associated fixed input resistances 64 and 66. By changing the common feedback resistance value of potentiometer 94, the gains of all the amplifier inputs will be changed in the same proportions, so that a general amplifier scale factor adjustment can be made through servo 104 without changing the individual coefficient potentiometers 52. This feature can be automated through the central control system to obtain automatic computer circuit scaling. Also, by use of wide frequency bandwidths in connection with the amplifiers 78, computations may be performed at all speeds from slower than real time to very high speeds and can be operated on different loads, such as a "one-shot" D.C. computer, a D.C. computer with repetitive operation, or as a high speed truly repetitive, iterative and statistical analog computer.

The basic principles of the amplifier circuit described with respect to FIGURE 3 including the associated automatic coefficient characteristic controls, may be adapted for use in connection with other operational units requiring input amplifiers such as units which perform multiplication and division operations. For example, in connection with a quarter-square semiconductor multiplier having similar input and feedback network arrangements as described with respect to FIGURE 3, squaring of an input voltage times a negative scale factor may be achieved, squaring the sum of two input voltages times the respective negative scale factors, squaring the difference between two input signals times the respective negative scale factors, multiplication of two input signals times a negative scale factor, multiplication of two input signals times a positive scale factor, generation of the quotient between two input signals times a negative scale factor, generation of the quotient between two input signals times a positive scale factor, and generation of the reciprocal function of an input signal times a positive or negative scale factor. The interconnection and operation characteristics for achieving the aforementioned functions, would be similar to those described with respect to FIGURE 3. Other operational units requiring input amplifiers such as function generating units consisting of a number of diode segment straight line circuits, logic operations units consisting of electronic switches and comparators, non-linear units consisting of limiting circuits, sine-cosine generating circuits and resolvers may be constructed on a similar basis. All of these other operational circuits or units will be available in connection with the computational units described through a central control system.

Figure 5:
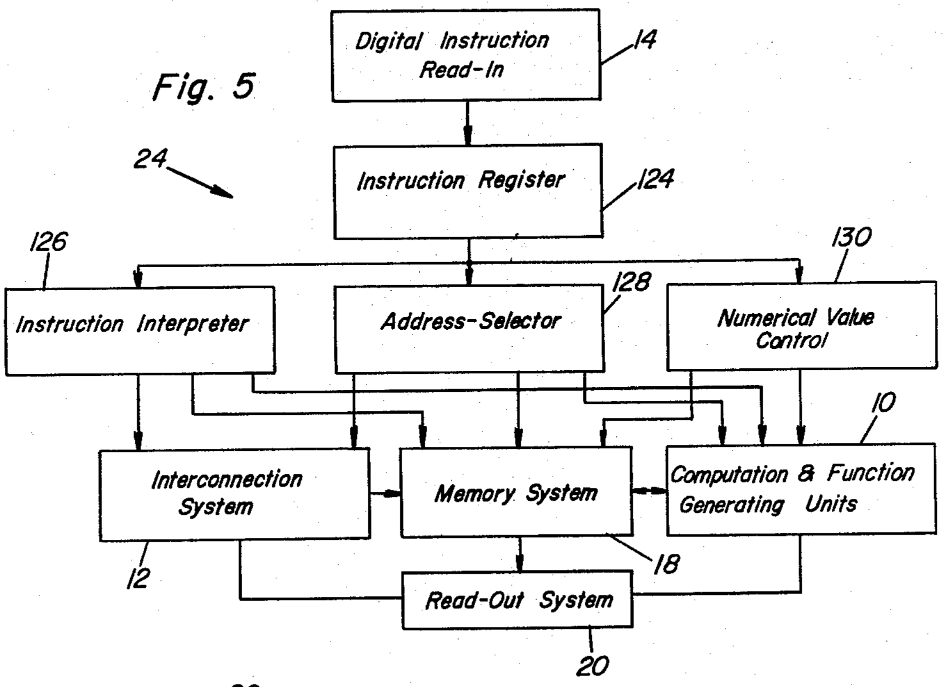
FIGURE 5 is a schematic flow diagram illustrating the digital control system associated with the computer system of the present invention.

In view of the digital instruction to which the computational units of the present invention respond, a digital control system is involved as diagrammatically illustrated in FIGURE 5. Instructions may therefore be derived from the digital instruction read-in devices 14 in the form of decimal digit instruction words consisting of three separate digit groups, one containing information on the type of operation to be performed by the control system, the second giving the address of the operational unit involved, and the third digit group referring to the numerical value of the coefficients or scale factors to be set by the control system. The decimal digit instructions prior to execution are therefore read into and stored in an instruction register 124 which at any time contains only one instruction. From the instruction register, the required operational functions are established and carried out through the use of an instruction interpreting system 126, an address selection unit 128 and the numerical value control 130 for remote control of the coefficient and interconnection selectors as described in connection with FIGURE 3. The instructions are carried out sequentially, the instruction at any particular instant overruling previous instructions to the same address, and each instruction being stored in the instruction register 124 long enough for the control system to take the required actions so that performance of the instruction system can be described as asynchronous. By use of special codes, the instruction words can be made to interpret the information which is read in according to the operation of the computer, in different ways, permitting high speed translations between computations, read-in of instructions, storage of signals and data and display of solutions on an automatic basis. It will be noted from FIGURE 5 however, that included in the system, is the memory system or devices 18.

Figure 6:
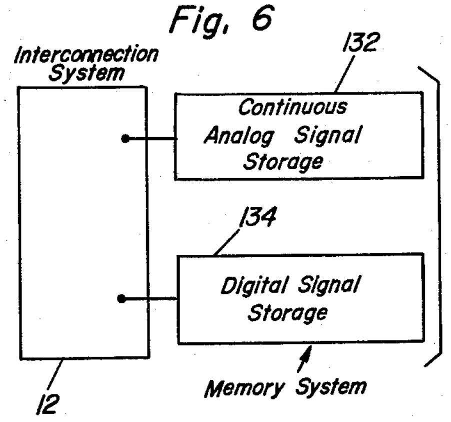
FIGURE 6 is a diagrammatic illustration of the memory system of the present invention.

As diagrammatically shown in FIGURE 6, the memory system may store continuous analog signals on a track 132 in the form of frequency modulated signals for example. The stored signals can be reproduced or transferred to other storage units involving magnetic tape, discs or drums permitting communication between the memory system of the computer with a large peripheral memory system for solution of complex problems, processing of large amounts of signal data, and direct communication over long distance with other storage units, computers or data processors. In addition to the basic analog signal storage provided, a number of decimal digit storage facilities 134 may be incorporated in the memory system for storage and processing of decimal digit instructions, numerical coefficient values or for the generation of optimization procedure in exploratory computations and simulations for logic decision making or for program and problem check out procedures. Also, by relating the cyclic speed of the memory system to the repetition rate of the computer, the necessary triggering and synchronization can easily be obtained.

From the foregoing description, the operation and utility of the computer system of the present invention will be apparent. It will be further appreciated, that the operational amplifiers of the operational units may be transistorized with plug-in connections in accordance with most recent installational developments and amplifier design and circuitry of input and feedback element arrangements together with remote control of all operational characteristics. The control system may include therefore decimal digit registers for digital instructions and data and the necessary command pulse generators for completely automatic program set up and execution, constituting the linkage between the analog computations performed by the computational units and the read-in and read-out of information therefrom. It will also be appreciated, that each of the computational units includes a complete interconnection unit which is related to the central control system and which can be connected to any of the interconnection matrices of the other computational units, to read-in or read-out data devices, to the memory storage system etc. Further, through the use of amplifier committed potentiometers and committed interconnections through the interconnection matrices, modular assembly of the units is facilitated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an analog computer having digital control means for issuing digital instructions, a plurality of operational units, each unit comprising, signal selecting input means for receiving a plurality of signals of different speeds and modes in accordance with read-in instruction from said digital control means, output means operatively connected to said input means to produce both digital and analog information under control of read-out instruction from said digital control means, remotely controlled feedback means operatively connected to said input means and output means for establishing signal feedback paths from the output means to the input means in accordance with corrective and operational instructions from the digital control means, interconnection means for establishing uncommitted signal paths to said input means and committed signal paths from said output means to and from the digital control means transmitting said digital and analog information, and gain adjustment means operatively connected to the output means and the feedback means for regulating signal feedback along said feedback paths in accordance with corrective instruction from the digital control means.

2. The combination of claim 1, wherein said input means comprises signal selector means adapted to receive signal voltages from said uncommitted signal paths, variable resistance means connected to the signal selector means for variation of the signal voltages, means operatively connected to said signal selector means and variable resistance means for sequentially selecting said signal voltages from the uncommitted signal paths of the interconnection means and coefficient values for variation of the signal voltages, and electronic switch means operatively connected in series with said resistance means to perform selected computational operations with coefficient varied signal voltages in accordance with operational instructions from the digital control means and the characteristics of the signal voltages.

3. The combination of claim 2, wherein said remotely controlled feedback means comprises a plurality of parallel connected resistive and capacitive elements and a common resistive element connected in parallel to said output means, said common resistive element being connected to the variable resistance means in parallel with said electronic switch means, and operational selector means selectively connecting one of said plurality of parallel connected elements to the output of said electronic switch means to control the computational operations performed.

4. The combination of claim 3, wherein said output means comprises amplifier means having high gain, wide frequency bandwidth and an extended signal voltage range, and relay-operated switch means for connecting a committed output signal path of the interconnection means to said amplifier means or to a reference voltage line.

5. The combination of claim 4, wherein said gain adjustment means comprises a digital ratiometer operatively connected to said reference voltage line and said committed output signal path for producing a corrective output signal, relay means operatively connected to said switch means, and relay control means operatively connecting said relay means and input means to the digital control means in response to said corrective output signal from the digital ratiometer.

6. The combination of claim 1, wherein said remotely controlled feedback means comprises a plurality of parallel connected resistive and capacitive elements and a common resistive element connected in parallel to said output means, and operational selector means selectively connecting one of said plurality of parallel connected elements to the output of said input means to control the computational operations performed.

7. The combination of claim 1, wherein said output means comprises amplifier means having high gain, wide frequency bandwidth and an extended signal voltage range, and relay-operated switch means for connecting a committed output signal path of the interconnection means to said amplifier means or to a reference voltage line.

8. The combination of claim 7, wherein said gain adjustment means comprises a digital ratiometer operatively connected to said reference voltage line and said committed output signal path for producing a corrective output signal, relay means operatively connected to said switch means, and relay control means operatively connecting said relay means and input means to the digital control means in response to said corrective output signal from the digital ratiometer.

9. In an analog computer having digital control means for issuing digital instructions, a plurality of operational units, each unit comprising, input means for receiving digital and analog signals in accordance with read-in instruction from said digital control means, output means operatively connected to said input means to produce both digital and analog information under control of read-out instruction from said digital control means, remotely controlled feedback means operatively connected to said input means and output means for establishing signal feedback paths from the output means to the input means, said input means comprising signal selector means to which signal voltages are applied, variable coefficient resistance means connected to the signal selector means for variation of the signal voltages, and electronic switch means operatively connected in series with said resistance means to perform selected computational operations with coefficient varied signal voltages in accordance with operational instructions from the digital control means and the characteristics of the signal voltages.

10. The combination of claim 9, wherein said remotely controlled feedback means comprises a plurality of parallel connected resistive and capacitive elements and a common resistive element connected in parallel to said output means, said common resistive element being connected to the variable resistance means in parallel with said electronic switch means, and operational selector means selectively connecting one of said plurality of parallel connected elements to the output of said electronic switch means to control the computational operations performed.

11. In an analog computer having digital control means for issuing digital instructions, a plurality of computational units, each unit including variable resistance means, an operational amplifier circuit connected in series with said variable resistance means and having a resistive feedback, interconnection means for establishing uncommitted signal paths to said variable resistance means to sample input voltages and established committed signal paths from the amplifier circuit to said digital control means to regulate the gain of the operational amplifier and input signal amplifier means selectively connected in series with said variable resistance means by the uncommitted signal paths of the interconnection means to multiply the input voltages by factors which are the product of the gain ratio of the signal amplifier means and the resistance value of the variable resistance means.

12. The combination of claim 11, wherein said digital control means includes digital read-in means, instruction control means operatively connecting said read-in means to the interconnection means for transfer of digital instructions to the computational units, read-out devices operatively connected to the interconnection means for display of digital and analog information transferred thereto from the computational units and memory means operatively connected to said interconnection means for temporary and simultaneous storage of digital and analog information.

13. The combination of claim 12 wherein said memory means includes continuous analog storage means supplying computational control signals to the computational units and the read-out devices and digital storage means supplying coefficient value information and digital instruction synchronized with cyclic operation of the computer.

14. The combination of claim 9, wherein said digital control means includes digital read-in means, instruction control means operatively connecting said read-in means to the interconnection means for transfer of digital instructions to the operational units, read-out devices operatively connected to the interconnection means for display of digital and analog information transferred thereto from the operational units and memory means operatively connected to said interconnection means for temporary and simultaneous storage of digital and analog information.

15. The combination of claim 11, wherein said signal varying means comprises signal selector means adapted to select an uncommitted signal path conducting either digital or analog signal voltages, variable resistance means connected to the signal selector means for variation of the signal voltages, servo motor means operatively connected to said signal selector means and variable resistance means for sequentially selecting said signal voltages from the uncommitted signal paths of the interconnection means and coefficient values for variation of the signal voltages.

16. In an analog computer having digital control means for issuing digital instructions, a plurality of operational units, each unit comprising, input means for receiving a plurality of signals of different speeds and modes in accordance with read-in instruction from said digital control means, output means operatively connected to said input means to produce both digital and analog information under control of read-out instruction from said digital control means, said input means comprising signal selector means adapted to receive either digital or analog signal voltages, variable resistance means connected to the signal selector means for variation of the signal voltages, means operatively connected to said signal selector means and variable resistance means for sequentially selecting said signal voltages from the uncommitted signal paths and coefficient values for variation of the signal voltages, and electronic switch means operatively connected in series with said resistance means to perform selected computational operations with coefficient varied signal voltages in accordance with operational instructions from the digital control means and the characteristics of the signal voltages.

17. In combination with a source of digital and analog signals and a continuous memory device, a computing unit comprising, signal selecting means operative to receive signal voltages from selected paths connected to said source representative of input quantities, input scaling means connected to said selected paths by the signal selecting means for varying the signal voltages to multiply said input quantities by coefficient factors, computing circuit means connected to the input scaling means for performing predetermined operations on said multiplied input quantities, computational control means connected to the computing circuit means for predetermining said operations, output means connected to the computing circuit means for transmitting digital and analog outputs therefrom to the memory device and digital control means connected to the output means for supply of digital instruction to the signal selecting means and the computational control means.

18. The combination of claim 17 wherein said computing circuit means comprises, electronic switch means connected to said selected paths for alternatively adding the input quantities or separately sampling said input quantities, an amplifier connected to said electronic switch means, adjustable feedback resistor means controlled by the computational control means to establish a feedback path between the amplifier and the switch means when adding the input quantities rendering the amplifier operative to produce an amplified output reflecting the summation of said input quantities, selective feedback means controlled by the computational control means for coupling the amplifier to the switch means when separately sampling the input quantities, said selective feedback means including feedback resistors and capacitive coupling means for rendering the amplifier operative to produce an amplified output reflecting an integrated value of one of said input quantities under conditions prescribed by another of the input quantities.

19. In an analog computing circuit having an operational amplifier and a controlled feedback path between the input and output of the operational amplifier, a plurality of signal input lines from which input voltages are sampled, input sampling means operatively connected to the input of the operational amplifier for selecting one of said signal input lines as a source of input voltage and a corresponding voltage dropping resistance in series therewith through which the operational amplifier is supplied, digital ratiometer means operatively connected to the output of the operational amplifier for correctively regulating the value of the voltage dropping resistance to obtain a calibrated gain ratio through the operational amplifier, and an input amplifier connected in at least one of said signal input lines, said input amplifier having a gain ratio factor equal to the ratio of feedback impedance of said feedback path to the impedance of the input to the operational amplifier so that the corresponding voltage dropping resistance may be set to values representing coefficients above and below unity as products of the gain ratio factor of the input amplifier and the value of the voltage dropping resistance.

20. In combination with a digital instruction system, a plurality of input voltage sources, a plurality of computation units connected to the digital instruction system and voltage level reference means connected to said digital instruction system and the computation units for regulation thereof through instructions supplied by the digital instruction system, at least one of said computation units including, means for selectively sampling said voltage sources in response to instructions from the digital instruction system, computing circuit means connected to said selective sampling means for performing operations on the sampled voltages, and read-out control means operatively connecting the computing circuit means and the voltage level reference means to the digital instruction system for supply of corrective instructions to the selective sampling means.

References Cited by the Examiner

UNITED STATES PATENTS

| | | | |
|---|---|---|---|
| 2,932,471 | 4/1960 | Exner | 235—150 |
| 3,037,699 | 6/1962 | Lee | 235—154 |

MALCOLM A. MORRISON, *Primary Examiner.*

K. W. DOBYNS, *Assistant Examiner.*